UNITED STATES PATENT OFFICE.

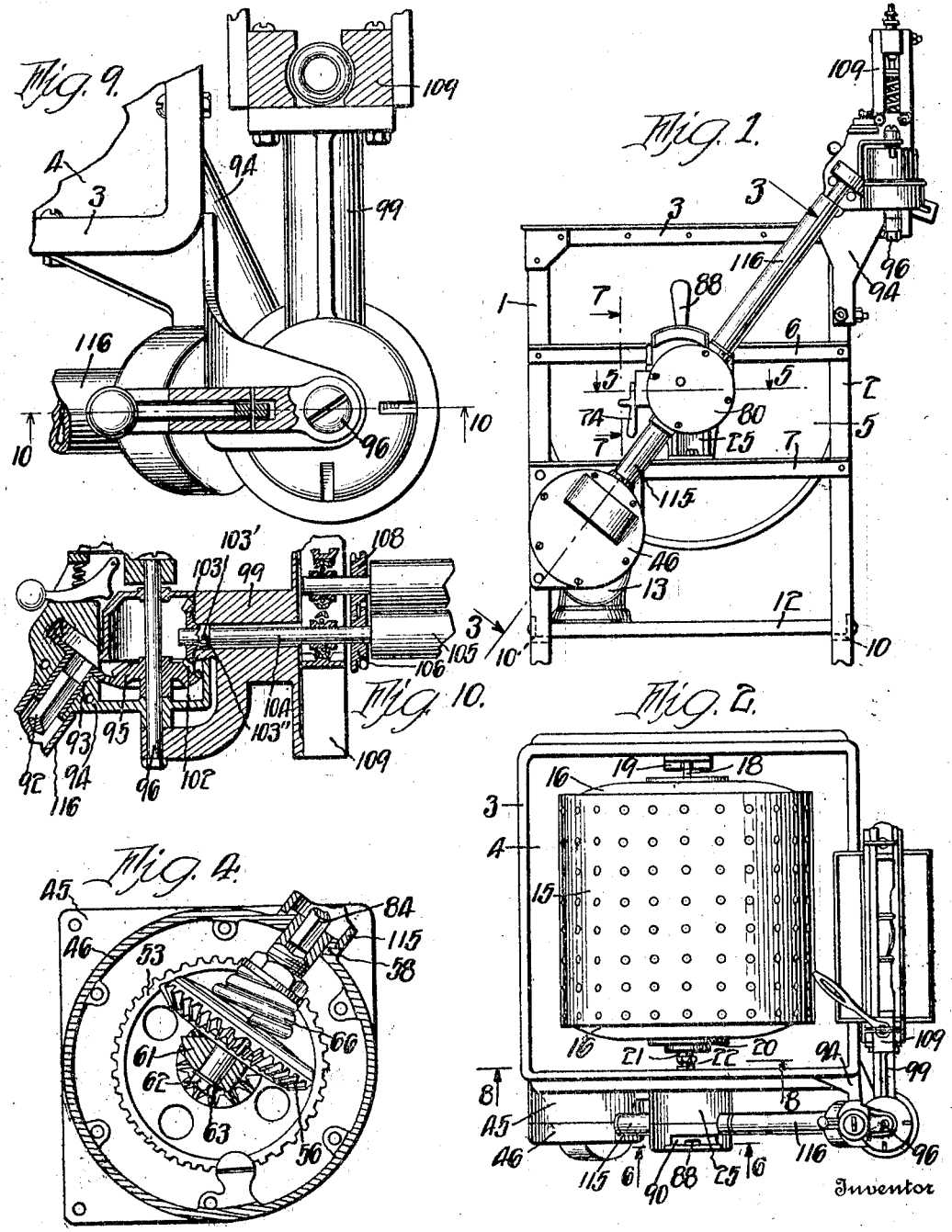

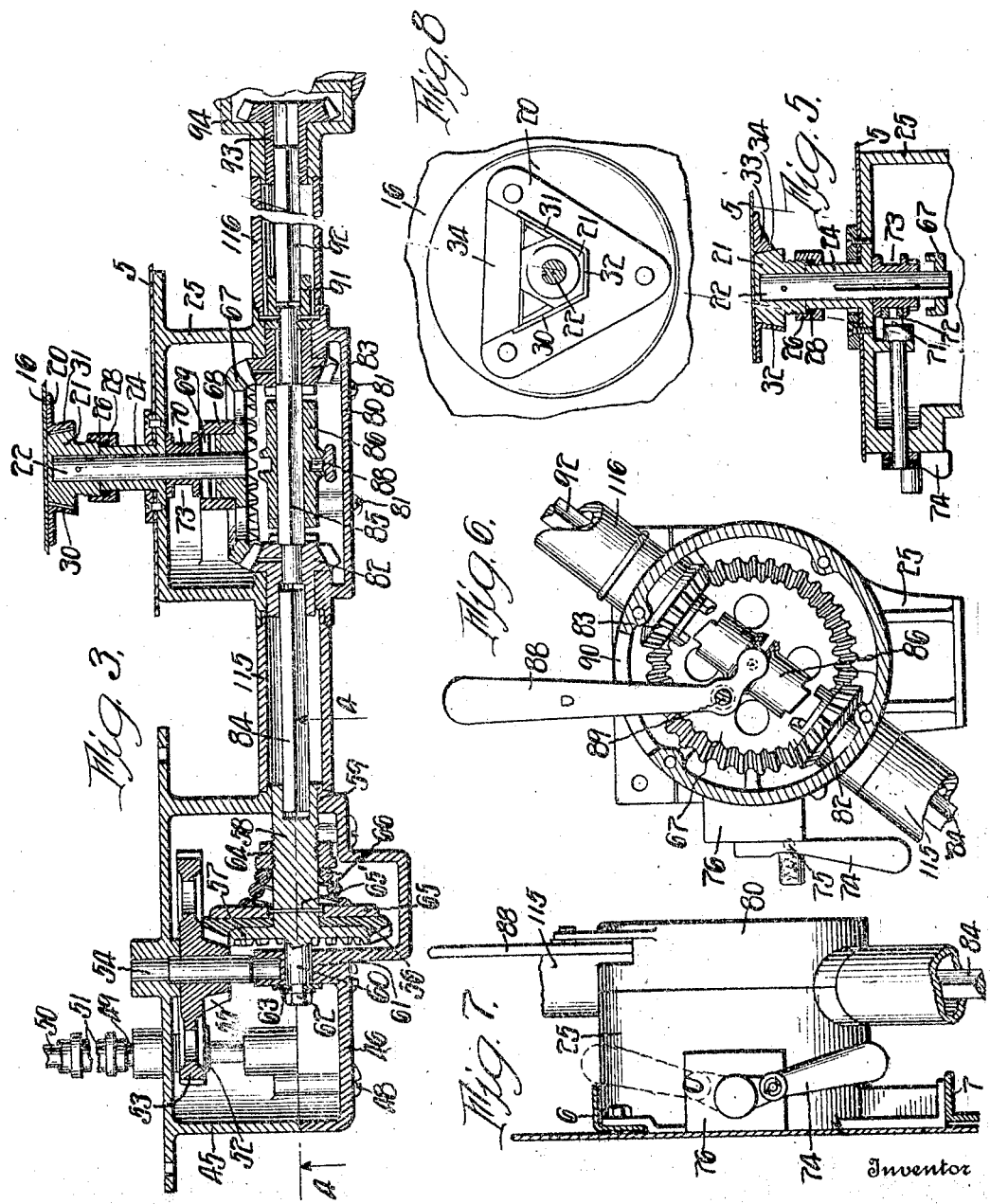

HERMAN A. SPERLICH, OF HIGHLAND PARK, MICHIGAN, ASSIGNOR TO CRYSTAL WASHING MACHINE COMPANY, OF DETROIT, MICHIGAN, A CORPORATION OF MICHIGAN.

GEARING FOR WASHING-MACHINES.

1,313,423.  Specification of Letters Patent.  Patented Aug. 19, 1919.

Original application filed March 30, 1917, Serial No. 158,607. Divided and this application filed March 21, 1918. Serial No. 223,731.

*To all whom it may concern:*

Be it known that I, HERMAN A. SPERLICH, a citizen of the United States, and residing at Highland Park, in the county of Wayne and State of Michigan, have invented a new and Improved Gearing for Washing-Machines, of which the following is a specification.

The present invention relates to gearing which is particularly intended for washing machines, more especially to machines comprising a cylinder which rotates about a horizontal axis and a wringer arranged to swing about a vertical axis. Among its important features are certain releasing mechanism whereby slippage is allowed between the motor shaft and the rest of the gearing when undue resistance is offered to either cylinder or wringer. This not only prevents the fuses from blowing out and the motor from burning out, but also avoids any likelihood of serious injury to the user should the latter be caught in the mechanism. The invention also consists in a novel construction of line shafting for so connecting the motor, the cylinder driving shaft and the wringer that an efficient driving is secured without the necessity of accurate alinement of parts; in certain improvements in the arrangement of clutch mechanism whereby the cylinder is driven in a single direction by the line shafting and whereby the wringer may be driven in either direction at will; and in shaft connections for the motor whereby the possibility of the line becoming grounded with the frame of the machine (as often happens in prior constructions when water is spilled) is practically eliminated. The invention further consists in the details of construction shown, described and claimed.

The present application is a division of my application on washing machines, Serial Number 158,607, filed March 30, 1917.

In the drawings, Figure 1 is a side elevation of a preferred embodiment of the invention, and Fig. 2 is a plan view corresponding thereto, Fig. 3 is a section on the line 3—3 of Fig. 1. Fig. 4 is a section on the line 4—4 of Fig. 3. Fig. 5 is a section on the line 5—5 of Fig. 1. Fig. 6 is a section on the line 6—6 of Fig. 2. Fig. 7 is a section on the line 7—7 of Fig. 1. Fig. 8 is a section on the line 8—8 of Fig. 2. Fig. 9 is a fragmentary horizontal section showing the manner in which the wringer is mounted. Fig. 10 is a section on the line 10—10 of Fig. 9, the wringer being swung around 90°.

The tub frame (Figs. 1, 2, 8 and 9) includes the front posts 1 and the rear posts 2, the upper ends of which are preferably joined by a single continuous angle bar 3 to which the upper edge of the tub (which comprises the central portion 4 and ends 5) is riveted. Suitable bars 6 and 7 connect the posts at one side and form a support for certain portions of the driving mechanism, as hereinafter explained. The posts 1 are also joined below the tub by an angle bar 10 and the posts 2 are similarly connected at the same level. Extending across between the last named bars is a wooden board 12 upon the front portion of which an electric motor 13 is secured in any desired way. It will be observed that the bottom of the tub is of semi-cylindrical form.

The washing cylinder revolves about a horizontal axis. As best indicated in Figs. 2, 3, 5 and 8, the cylinder preferably includes the metal body portion 15 and ends 16, one of the latter having projecting therefrom a spindle 18 which is supported in a bracket 19 (Fig. 2) on the inner face of the tub. The other end of the tub has riveted thereto a bracket 20 (Figs. 5 and 8) which is shaped to detachably receive a tapered nut 21 rigid on the end of the cylinder driving shaft 22 that passes out through the end wall 5 of the tub. The driving shaft turns in the inwardly projecting boss 24 of a casing element 25 (bolted to the bars 6—7), leakage between the shaft and boss being prevented by a packing nut 26 (screwed onto the nut 21) and packing 28. The bracket 20 includes the outwardly projecting ribs 30 and 31 which are joined by the rib 32; it also includes a rib 33 that does not, however, project as far outwardly as do the other ribs; and which has an inclined face 34. It will be noted that the ribs 30 and 31 stand at an angle of 60° to the ribs 32 and 33, and that the rib 33 is spaced from the rib 32 sufficiently to form a pocket in which the tapered nut is snugly received. When the cylinder is to be put into the tub it is lowered until the spindle 18 is received in its socket in the bracket 19, the cylinder being turned so that the inclined face 34 of the rib is below the axis of said cylinder;

whereupon, when further pressure is applied to the cylinder, the face 34 wedges the nut 21 outwardly against the resiliency of the end of the tub until said end snaps the nut inwardly to bring it into close engagement with the walls of the pocket formed by the ribs. Power now being applied to the shaft, the cylinder is of course turned in the same direction. In detaching the cylinder it is only necessary to press the end of the tub outwardly until the rib 33 clears the nut, after which the cylinder may be lifted out, as is obvious.

Mounted on the bar 7 and an adjacent post 1 is a hollow casing including the base portion 45 and a cap 46 attached thereto by screws 48. An extension 49 of the motor shaft 50 is rotatable in suitable bosses formed on the casing, and is connected to the motor shaft proper by a piece of rubber hose 51, whereby grounding of the motor with the shaft 49 is prevented and whereby accurate alinement of the shafts is rendered unnecessary. A pinion 52 on the shaft 49 meshes with a gear 53, the shaft 54 of which is mounted in reduced bearings formed in the casing; the gear 53 also includes the bevel teeth 55 that mesh with the teeth of a bevel gear 56, the front face of which bears against a thrust receiving or friction element 57 upon the shaft or hub 58 of which said gear is mounted. One end of the shaft 58 is mounted in a boss 59 on the casing, and the other end 60, which is reduced, is received in a bearing in the boss 61 (the shaft 54 also bears in said boss). The end 60 is tapped to receive a cap screw 62 between which and the boss 61 washers 63 are interposed. Obviously, the cap screw holds the gear 56 in mesh with the teeth 55; it will be understood that the washers 63 rotate with the shaft 58. The latter is threaded externally to receive a nut 64 between which and the gear 56 a friction disk 65 and a coil spring 66 are interposed (the disk is prevented from rotating on the shaft by a cross pin 65', the ends of which project into slots in the disk); consequently, in case undue resistance is offered to the rotation of the shaft 58, slippage may take place, the torque which will be transmitted being determined by the adjustment of the nut 64. It will be noted that a large reduction of speed is afforded by the gears in the casing 45—46.

The cylinder driving shaft 22 has its outer end loosely mounted in the hub of a bevel gear 67 that is, in turn, rotatable in a bearing 68 formed on the casing element 25 Fig. 3). The inner face of the hub of the gear 67 is provided with clutch jaws with which jaws 69 on a clutch member 70 engage when said clutch member is in one position. The latter is keyed on the shaft 22 and may be shifted longitudinally thereof by a crank 71 which carries a roller 72 (Fig. 5) that projects into a circumferential groove 73 in the clutch member. A lever 74 affords means for manipulating the crank, and a spring pressed latch ball 75, the end of which is adapted to be received in either one of two notches in the boss 76, automatically holds the crank at either limit of movement.

Associated with the casing element 25 is a cap 80 that may be secured thereto by screws 81; the casing so formed affords bearings for a pair of alined bevel clutch gears 82 and 83 that mesh with the gear 67. The hub of the gear 82 is connected to the shaft section 58 by means of a shaft section 84 conveniently formed of a bar square in cross section, consequently the parts need not be in accurate alinement with one another. Rotatably mounted in the clutch gears 82—83 is a clutch shaft 85 (also preferably formed from rectangular bar stock) upon which a jaw clutch 86 is slidable by means of a yoke lever 88 pivoted at 89 and having one of its ends projecting through a slot 90 in the casing (Fig. 6). The shaft 85 projects from the gear 83 and is pin-connected to a socket member 91 which receives one end of a shaft member 92 (also preferably of rectangular bar stock), the other end of which is received in the hub of a bevel gear 93 (Figs. 3 and 10). The latter is mounted in a casing element 94 bolted to the upper rear corner portion of the frame and meshes with a bevel gear 95 that is free to rotate about a pivot bolt 96, and swingable about the latter is a combined shaft casing and wringer supporting arm 99. The gear 95 also preferably has teeth 102 of less pitch diameter than the teeth which engage the gear 93, and meshing with the latter is a bevel gear 103 that drives the shaft 104 of one of the wringer rollers 105. The hub of the gear 103 fits in a bearing in the arm 99 and is slotted at 103' to receive a pin 103" that passes through the shaft—this allows the shaft 104 to be easily assembled with reference to the gear. The other wringer roller is also positively driven through the medium of the spur gears 106 and 108 (Fig. 10). It will thus be seen that the wringer frame 109 may be swung about the bolt 96 to allow its use in three positions ninety degrees apart in a manner well known in the art.

Shaft casing sections 115 and 116 extend between and in sealing engagement with the casing 45—46 and the casing 25—80 and between and in sealing engagement with the latter and the casing element 94. Thus it will be seen that the several casings may be substantially filled with thick lubricant.

Operation: When the current is turned on the motor the shaft 84 is driven, provided the resistance offered thereto is not sufficient to cause slippage of the gear 56. If the clutches 70 and 86 are in the position shown in Fig. 3, the gears 82, 67 and 83 merely rotate idly. Should it be desired to drive the cylinder, the clutch 70 is shifted into engagement with the jaws of the gear 67; and by shifting the clutch into engagement with the particular gear 82 or 83 driving of the wringer in either direction takes place.

The details of construction may be varied within wide limits in some respects without departing from the spirit of the invention,— for example, the electric motor may be replaced by any other suitable motive power; I do not, therefore, wish to be limited except as indicated by the subjoined claims.

I claim:—

1. In a device of the character described, a supporting frame mounted to swing about a vertical axis, a pair of horizontal oppositely rotatable shafts supported in said frame, a second frame fixed relatively to said first frame and supporting the latter, a third shaft having a horizontal axis, said shaft being supported by the second frame, inclined shaft means extending across one side of the second frame in a substantially straight line, means coöperating with one end of the shaft means for driving said first mentioned shafts in a plurality of positions of the first mentioned frame, means coöperating with said shaft means at an intermediate point in the length thereof for driving said third shaft at will, and a motor driven shaft coöperating with the other end of said shaft means for driving the same.

2. In a device of the character described, a supporting frame mounted to swing about a vertical axis, a pair of horizontal shafts supported in said frame, said shafts being constrained to rotate in opposite directions, a second frame fixed relatively to said first frame and supporting the latter, a third shaft having a horizontal axis, said shaft being supported by the second frame, inclined shaft means extending across one side of the second frame in a substantially straight line that substantially intersects the axis of the third shaft, means coöperating with one end of the shaft means for driving said pair of shafts in a plurality of positions of the first mentioned frame, means coöperating with said shaft means at an intermediate point in the length thereof for driving said third shaft at will, and means also coöperating with said shaft means at an intermediate point in the length thereof for reversing the movement of one portion of the shaft means in respect to the other at will, and a motor driven shaft coöperating with the other end of said shaft means for driving the same.

3. In a device of the character described, a bevel gear, a housing comprising a hollow base in which the gear is received, the housing including a hollow detachable cap for the base, a shaft detachably held in the cap against displacement therefrom when the cap is removed from the base, a second bevel gear arranged to mesh with the first bevel gear and mounted on the shaft, and means for forming a slip connection between the second gear and the shaft.

4. In a device of the character described, a casing including a hollow base, a shaft supported at one end in said base, said casing including a hollow detachable cap for the base, the other end of the shaft being supported in the cap, a bevel gear rotatable about the axis of the shaft, a second shaft detachably held in the cap against displacement therefrom when the cap is removed from the base, a second bevel gear arranged to mesh with the first bevel gear and mounted on the second shaft, and means carried by the second shaft for forming a slip connection between it and the second gear.

5. In a device of the character described, a casing including a base and a cap, a shaft journaled in said base and cap, gear forming means rotatable about the axis of said shaft, said gear forming means including spur gear teeth and bevel gear teeth, a second gear meshing with said spur gear teeth, a second shaft for said second gear, a third shaft at right angles to the first shaft, a bevel gear on said third shaft and meshing with the bevel gear teeth of the gear forming means, and means within the casing coöperative with one end of said shaft whereby the third shaft may be forced bodily toward the axis of the first shaft to insure proper engagement of the bevel gear teeth with one another.

6. In a device of the character described, a gear casing and a shaft journaled therein, a bevel gear mounted on said shaft, a second shaft member having an axis at right angles to the axis of the first shaft, one end of said second shaft member being journaled in the casing, a bevel gear mounted on said second shaft member, said second shaft member including a disk-like element against which the last mentioned bevel gear may press, and a second disk-like element arranged to be yieldingly pressed against the other side of the last named bevel gear, whereby slippage is allowed when undue resistance is offered to rotation of the second shaft member, and means for adjusting said second shaft member longitudinally of its own axis to secure proper driving engagement between the teeth of the gears.

7. In a device of the character described, a driven gear, a shaft section for said gear, a casing for the shaft and gear, said shaft section being supported at both ends to rotate in the casing, means for holding the shaft section from shifting longitudinally of its own axis, one end of the shaft section having an opening therein of non-circular cross-section, a second shaft section of cross section corresponding to that of the opening received in said opening and being free for limited sliding movement therein longitudinally of said first named shaft section.

8. In combination, a first end shaft, a second end shaft, and an intermediate shaft alined with the end shafts, a bevel gear constrained to turn with the first shaft, a second bevel gear meshing with the first gear, a third bevel gear meshing with the second gear, a clutch slidable on the intermediate shaft and adapted to couple either the first gear or the third gear thereto at will, the first gear being positively connected to the first shaft and being rotatable in respect to the intermediate shaft except when coupled thereto by the clutch, the intermediate shaft being positively connected to the third shaft and the third gear being rotatable in respect to the intermediate shaft except when coupled thereto by the clutch, a fourth shaft coaxial with the second gear, and a clutch for connecting the second gear to the fourth shaft at will.

9. In a device of the character described, an intermediate shaft, a first end shaft and a second end shaft alined therewith, a double jaw clutch slidable on the intermediate shaft, a first bevel gear and a second bevel gear facing each other, one being at each end of the intermediate shaft, said bevel gears having clutch jaws adapted to be engaged by the clutch, said clutch shaft being fixed to the second end shaft to rotate therewith, said first bevel gear being positively connected to the first end shaft and being free to turn on the intermediate shaft except when clutched thereto, both the intermediate shaft and the second end shaft being free to rotate in respect to the second bevel gear except when clutched thereto, and a third bevel gear meshing with said first and second gears.

10. In a device of the character described, a driving shaft, a bevel gear fixed thereon, a second bevel gear in mesh with the first bevel gear and having a hub, a bearing in which the hub of the second bevel gear turns, said hub having clutch jaws, a driven shaft alined with the second bevel gear and a clutch slidable on said driven shaft to connect the second bevel gear thereto at will.

11. In a device of the character described, a driven bevel gear having a hub with clutch jaws formed thereon, a bearing surrounding the hub, a shaft coaxial with said gear, a jaw clutch slidable on said shaft and into the bearing to connect the shaft to the gear at will.

12. In combination, a first shaft section of non-circular bar stock, a second shaft section of non-circular bar stock, a clutch shaft between said sections and substantially alined therewith, a first bevel gear receiving the end of the first shaft section and forming a bearing therefor and constrained to rotate therewith at all times, a second bevel gear, a clutch for connecting either of said gears to the clutch shaft, the clutch shaft passing through the second gear and being secured to the second shaft section to drive the latter, said clutch shaft being free to turn in the second gear except when clutched thereto and also being free to turn in the first gear except when clutched thereto.

13. In a device of the character described, an upper shaft section, a lower shaft section, and a clutch shaft intermediate between said shaft sections and alined therewith, a pair of bevel gears facing each other, one being at each end of the clutch shaft, a fourth shaft at right angles to the other shafts, a bevel gear coaxial with and adapted to rotate in respect to the fourth shaft, a single casing surrounding the bevel gears, and two clutches within the casing, the parts being so constructed and arranged that the fourth shaft may be driven constantly in one direction from the lower shaft at will and the upper shaft may be driven from the lower shaft in either direction at will or may be disconnected therefrom.

HERMAN A. SPERLICH.